US009082154B2

(12) United States Patent
O'Donnell (10) Patent No.: US 9,082,154 B2
(45) Date of Patent: Jul. 14, 2015

(54) AGGREGATION AND SEMANTIC MODELING OF TAGGED CONTENT (75) Inventor: Tony O'Donnell, Kildare Town (IE)

(73) Assignee: SAP SE, Walldorf (DE)

( * ) Notice: Subject to any disclaimer, the term of this patent is extended or adjusted under 35 U.S.C. 154(b) by 592 days.

(21) Appl. No.: 13/420,867

(22) Filed: Mar. 15, 2012

(65) Prior Publication Data
US 2013/0246897 A1 Sep. 19, 2013

(51) Int. Cl.
*G06F 17/22* (2006.01)
*G06Q 50/00* (2012.01)
*H04L 12/58* (2006.01)
*G06F 17/27* (2006.01)

(52) U.S. Cl.
CPC ............ *G06Q 50/01* (2013.01); *G06F 17/2785* (2013.01); *H04L 51/04* (2013.01); *H04L 51/16* (2013.01)

(58) Field of Classification Search
USPC .................................. 715/201, 234, 255, 256
See application file for complete search history.

(56) References Cited

U.S. PATENT DOCUMENTS

| 8,250,233 | B2 * | 8/2012 | Robertson et al. | 709/234 |
|---|---|---|---|---|
| 8,312,056 | B1 * | 11/2012 | Peng et al. | 707/802 |
| 8,370,294 | B2 * | 2/2013 | Lyakhovitskiy | 707/609 |
| 8,566,309 | B2 * | 10/2013 | Jennings | 707/723 |
| 8,719,302 | B2 * | 5/2014 | Bailey et al. | 707/790 |
| 8,751,511 | B2 * | 6/2014 | Dong et al. | 707/749 |
| 8,954,451 | B2 * | 2/2015 | Zendejas et al. | 707/749 |
| 2010/0088187 | A1 * | 4/2010 | Courtney et al. | 705/14.73 |
| 2010/0312769 | A1 * | 12/2010 | Bailey et al. | 707/740 |
| 2011/0055723 | A1 * | 3/2011 | Lightstone et al. | 715/752 |
| 2011/0178995 | A1 * | 7/2011 | Suchter et al. | 707/692 |
| 2011/0246457 | A1 * | 10/2011 | Dong et al. | 707/725 |
| 2012/0041953 | A1 * | 2/2012 | Dumais et al. | 707/739 |
| 2012/0066212 | A1 * | 3/2012 | Jennings | 707/723 |
| 2012/0066231 | A1 * | 3/2012 | Petersen et al. | 707/748 |
| 2012/0066312 | A1 * | 3/2012 | Kandekar et al. | 709/205 |
| 2012/0066316 | A1 * | 3/2012 | Petersen et al. | 709/206 |
| 2013/0110823 | A1 * | 5/2013 | Su et al. | 707/723 |
| 2013/0232208 | A1 * | 9/2013 | Lao | 709/206 |

OTHER PUBLICATIONS

Pang et al. "Opinion Mining and Sentiment Analysis", Foundations and Trends in Information Retrieval, 2008, 94 pages.*
C. Lee "Unsupervised and Supervised Learning to Evaluate Event Relatedness Based on Content Mining from Social-Media Streams," Dec. 2012, pp. 13338-13356.*
C. Lee et al. "A Novel Approach for Event Detection by Mining Spatio-temporal Information on Microblogs," IEEE, Jul. 2011, pp. 254-259.*

(Continued)

*Primary Examiner* — Maikhanh Nguyen
(74) *Attorney, Agent, or Firm* — Buckley, Maschoff & Talwalker LLC (57) ABSTRACT

A system includes reception of first text including a first identifier, storage of the first text in a memory area associated with the first identifier, reception of second text including the first identifier, storage of the second text in the memory area associated with the first identifier, and determination that a size threshold associated with text stored in the memory area has been reached, the text stored in the memory area comprising at least the first text and the second text. In response to the determination, a semantic representation of the text stored in the memory area is generated and the semantic representation is stored in association with the first identifier.

18 Claims, 4 Drawing Sheets

(56) References Cited

OTHER PUBLICATIONS

C. Lee et al. "A Self-adaptive Clustering Scheme with a Time-Decay Function for Microblogging Text Mining," IEEE, Jun. 2011, pp. 62-71.*
Harrison "Using Micro-blogging to record architectural design conversation alongside the BIM", 2009, 12 pages.*
European Patent Office, "Extended European Search Report", dated Jun. 7, 2013, for Application No. 13000682.8-1955, 7pgs.
Laurens De Vocht et al., Semantically driven Social Data Aggregation Interfaces for Research 2.0, 11th International Conference on Knowledge Management and Knowledge Technologies, I-Know 2011, Sep. 2011, XP055064282, ISBN: 978-1-45-030732-1, 9pgs.
Pablo N. Mendes et al., "Twarql: Tapping Into the Wisdom of the Crowd", Proceedings of the 6th International Conference on Semantic Systems, Isemantics '10, Sep. 2010, XP055064643, 3pgs.
Ilknur Celik et al., "Towards a Framework for Adaptive Faceted Search on Twitter", Proceedings of the International Workshop on Dynamic and Adaptive Hypertexts: Generic Frameworks, Approaches and Techniques, Jun. 2011, XP055064638, 12pgs.
Adam Green, "Advantages of a Twitter API database cache", Twitter API Programming Tips, Tutorials, Source Code Libraries and Consulting, May 2011, XP055064703, [retrieved date May 30, 2013], retrieved from the Internet: URL:http://140dev.com/twitter-api-programming-tutorials/twitter-api-database-cache/, 2pgs.
Matthew A. Russell, "21 Recipes for Mining Twitter", In: 21 Recipes for Mining Twitter, Feb. 2011, O'Reilly Media, Inc., XP055064714, ISBN: 978-1-44-930316-7, (cover 4pgs. + Table of Contents v-ix + pp. 1-60, 68 total papes).

* cited by examiner

AGGREGATION AND SEMANTIC MODELING OF TAGGED CONTENT

BACKGROUND

Conventional electronic communication systems generate a vast amount of short, unstructured text. This text may be present within electronic mail messages or Short Message Service (SMS) messages sent from a sender to one or more specific recipients, within microblog messages (e.g., Twitter "tweets") posted to the World Wide Web, or within any other type of communication. Due to the lack of structure, and also due to the lack of content within each individual message, this text is not amenable to advanced storage, access and analysis techniques.

Hashtags are community-driven identifiers for specifying topics associated with microblog messages. Being both defined and selectively applied to a message by the message's author, hashtags are of limited use in effectively storing, accessing and analyzing microblog messages according to their semantic meanings.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
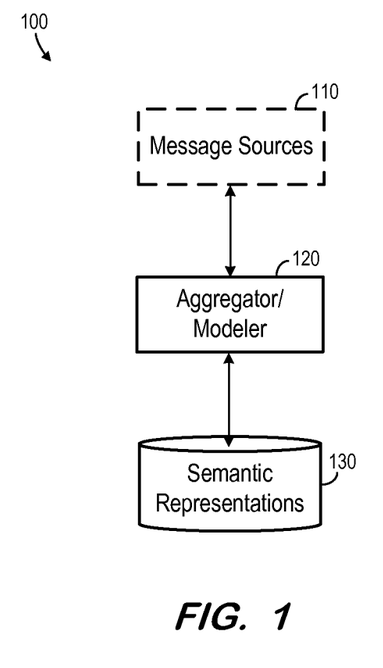
FIG. 1 is a block diagram of a system according to some embodiments.

FIG. 1 is a block diagram of environment 100. Environment 100 represents a logical architecture for describing some embodiments, and actual implementations may include more, fewer and/or different components arranged in any manner. The elements of environment 100 may represent software elements, hardware elements, or any combination thereof. For example, environment 100 may be implemented using any number of computing devices, and one or more processors within environment 100 may execute program code to cause corresponding computing devices to perform processes described herein.

Generally, each logical element described herein may be implemented by any number of devices coupled via any number of public and/or private networks. Two or more of such devices may be located remote from one another and may communicate with one another via any known manner of network(s) and/or via a dedicated connection.

Environment 100 includes message sources 110, aggregator/modeler 120 and semantic models 130. Message sources 110 are represented using a dashed line to indicate that any number and types of data sources may be used in conjunction with some embodiments. Non-exhaustive examples of message sources 110 include microblogging networks (e.g., Twitter), the World Wide Web, social networks (e.g., Facebook, LinkedIn), enterprise applications, groupware data (e.g., Microsoft Outlook files), one or more private intranets, one or more data warehouses, one or more text files, one or more spreadsheets and any other suitable message store and/or feed.

Aggregator/modeler 120 may operate to receive messages from message sources 110. Aggregator/modeler 120 may therefore include appropriate interfaces required for communicating with each type of message sources 110. As will be described below, aggregator/modeler 120 may generate semantic representations based on the text of the received messages. Briefly, aggregator/modeler 120 generates a semantic representation based on the text of one or more messages associated with a particular identifier (e.g., hashtag). Aggregator/modeler 120 may comprise an application running on an application platform which provides a suite of applications, such as but not limited to an enterprise resource platform. According to some embodiments, aggregator/modeler 120 is an application executed by a processor of a computing device.

Semantic representations 130 may comprise one or more data structures stored in a volatile or non-volatile memory device. As will be described below, each of semantic representations 130 is associated with a particular identifier (e.g., hashtag) according to some embodiments, and may advantageously represent a community-defined semantic meaning of the identifier. According to some embodiments, semantic representations 130 comprise semantic graphs, such as resource definition framework (RDF) graphs, which may be instantiated as an eXtensible Markup Language (XML) document according to known techniques. The semantic graphs may conform to Web Ontology Language or other suitable specifications that are or become known.

Figure 2:
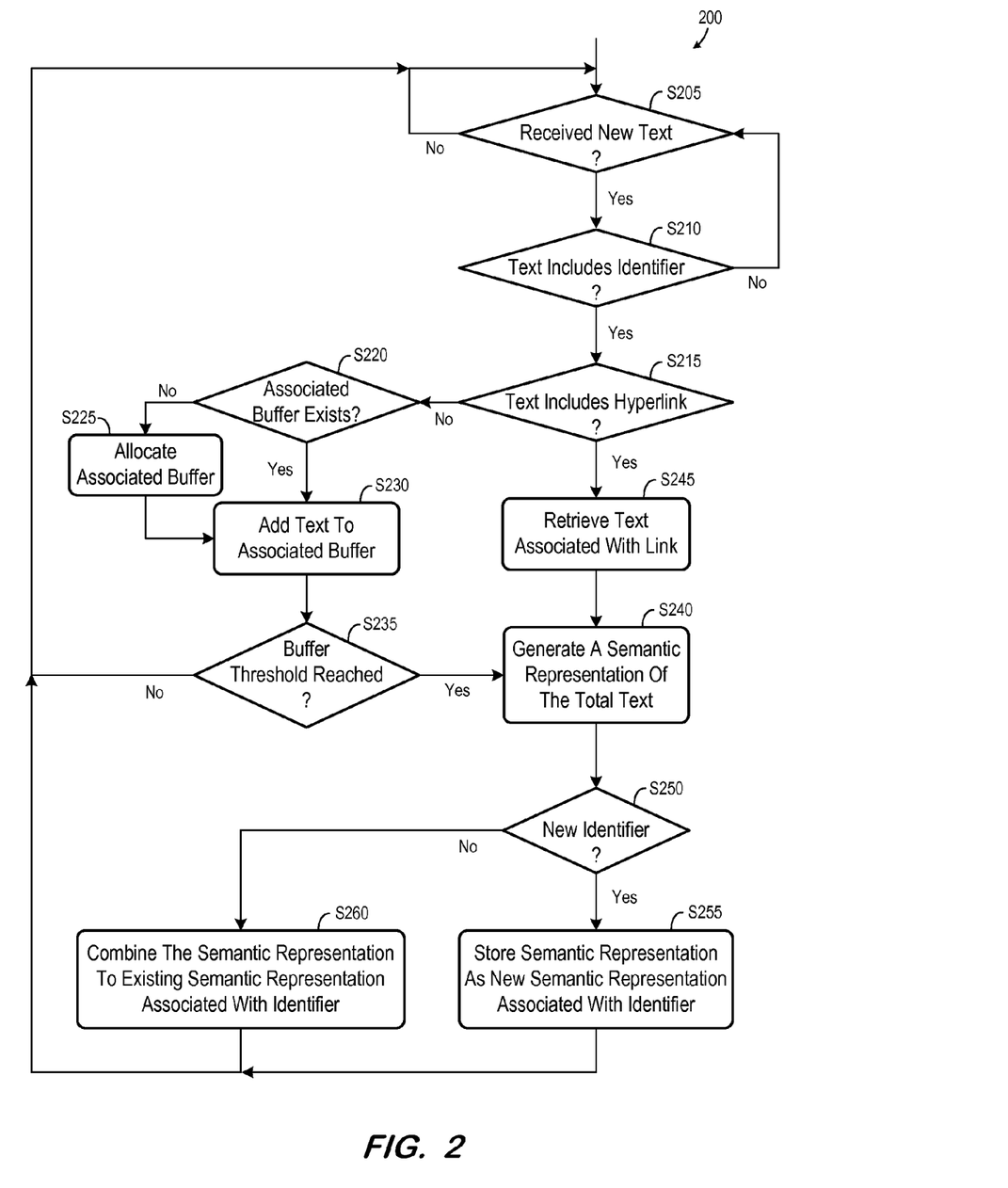
FIG. 2 is a flow diagram of a process according to some embodiments.

FIG. 2 comprises a flow diagram of process 200 according to some embodiments. Process 200 may be executed by aggregator/modeler 120 according to some embodiments. Process 200 and all other processes mentioned herein may be embodied in computer-executable program code read from one or more of non-transitory computer-readable media, such as a floppy disk, a CD-ROM, a DVD-ROM, a Flash drive, a fixed disk and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 3:
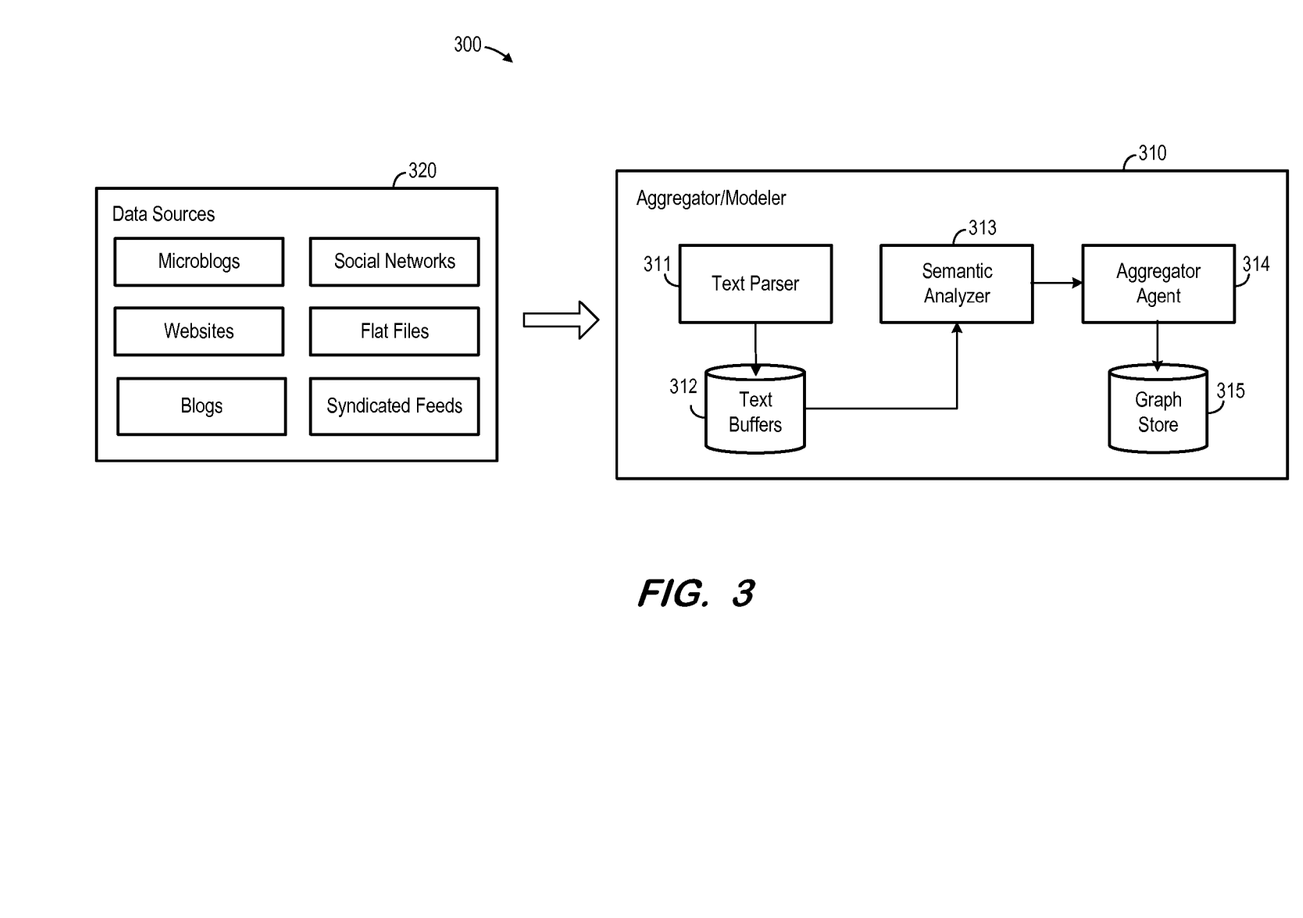
FIG. 3 is a block diagram of a system according to some embodiments.

FIG. 3 illustrates system 300 according to some embodiments. System 300 may comprise an implementation of environment 100, but embodiments of environment 100 and of system 300 are not limited thereto. Examples of process 200 will be described below with respect to system 300.

New text is initially received at S205. The new text and may be pushed from data sources 320 to aggregator/modeler 310 based on a subscription (e.g., a subscription to a particular data feed), requested by aggregator/modeler 310 from one or more data sources 320, obtained by a crawler service of aggregator/modeler 310, or otherwise received using any suitable mechanism that is or becomes known. According to some embodiments, aggregator/modeler 310 subscribes to (i.e., "follows") all microblogs of data sources 320, and the new text received at S205 is a message posted to one of the followed microblogs.

Next, at S210, it is determined whether the received text includes an identifier. According to the present example, text parser 311 operates at S210 to determine whether the received text includes a string beginning with "#" (e.g., #superbowl, #politics). Embodiments are not limited to this type of identifier. If the received text does not include an identifier, flow returns to S205 to await next text.

Flow proceeds from S210 to S215 if the text includes a suitable identifier. At S215, it is determined whether the text includes a hyperlink. For example, text parser 311 may determine whether the text includes a Uniform Resource Locator pointing to a resource on the World Wide Web. It will be assumed for the moment that the text does not include a hyperlink, and therefore flow continues to S220.

At S220, it is determined whether a buffer associated with the identifier exists. In this regard, text buffers 312 may comprise memory areas (i.e., groups of memory locations) within a memory device, with each memory area being associated with a respective identifier. With respect to the identifiers mentioned above, text buffers 312 may comprise a first memory area associated with the identifier #superbowl and a second memory area associated with the identifier #politics.

If no buffer associated with the identifier of the new text exists, a new buffer is allocated and is associated with the identifier at S225. The text is then added to the new buffer at S230. If a buffer associated with the identifier was determined to exist at S220, the text is simply added to the buffer at S230. In this latter case, the associated buffer will include previously-received text which included the same identifier.

In a case that the text includes more than one identifier, the text is added to the buffers associated with each of the more than one identifier. Of course a situation may arise in which a buffer associated with one of the identifiers will already exist at S220 and a buffer associated with another one of the identifiers will have to be allocated at S225.

At S235, it is determined whether a threshold associated with the buffer has been reached. The threshold may comprise a memory size, a number of stored texts, and/or any other characteristic based on which a buffer may be evaluated. If the threshold has not been reached, flow returns to S205. Accordingly, flow cycles as described above to allocate buffers associated with identifiers and to store received text associated with identifiers in the appropriate buffers.

If it is determined at S235 that a buffer has reached the buffer threshold, a semantic representation of all the text in the buffer is generated at S240. Generally, and according to some embodiments, the semantic representation indicates two or more entity types and one or more instances of each of the entity types that exist within the text. Therefore, generation of the semantic representation may consist of identifying entities which are present in the text, determining an entity type of each entity, and creating a semantic digest which lists the determined entity types and the entities of each type which exist in the text.

Prior to generation of the semantic representation at S240, the text may be transformed into a standardized format (e.g., Atom) which is suitable for input to the component which generates the semantic representation. According to the FIG. 3 embodiment, this component is semantic classifier 313. For example, semantic classifier 313 may receive text of the buffer from text buffers 312 and implement OpenCalais in order to generate an XML document describing an RDF graph therefrom.

It will now be assumed that the text received at S205 included a hyperlink. Flow therefore proceeds from S215 to S245 to retrieve text associated with the hyperlink. According to one example, the hyperlink points to a Web page, and text parser 311 operates to request the Web page from data sources 320. As is known, the hyperlink could point to any network-accessible file of any format. Flow then proceeds to S240 to generate a semantic representation based on the text received at S205 and on any text retrieved at S245 using the hyperlink. The generated semantic representation is associated with the identifier which was included in the text received at S205.

According to some embodiments, the semantic representation is generated after S245 based on the text received at S205, any text retrieved at S245 using the hyperlink, and the contents of any message buffer associated with the identifier. In some embodiments, the text retrieved at S245 is simply added to the associated message buffer, and flow continues therefrom to S235 and proceeds as described above.

After generation of a semantic representation at S240, it is determined whether the identifier associated with the semantic representation is already associated with a previously-stored semantic representation at S250. In this regard, graph store 315 stores semantic representations generated by process 200, each of which is therefore associated with an identifier (e.g., #superbowl). Aggregator agent 314 receives a semantic representation generated by semantic analyzer 313 and determines whether an identifier associated with the semantic representation is associated with a semantic representation stored within graph store 315.

If not, the semantic representation is stored in association with the identifier at S255. If the identifier is associated with an existing semantic representation stored within graph store 315, the current semantic representation is added to the existing semantic representation at S260. According to some embodiments, S260 includes applying a UNION operation to the current semantic representation and the existing stored semantic representation to create a third semantic representation which is stored in graph store 315 in association with the identifier. Other methods for creating a new semantic representation based on two semantic representations may be employed at S260.

Flow returns to S210 from S250/S255 to receive new text and continue as described above. The semantic representations of graph store 315 may be utilized for any number of purposes, including but not limited to discovering content related to particular identifiers, trend analysis, and data-mining or indexing of microblogs.

Figure 4:
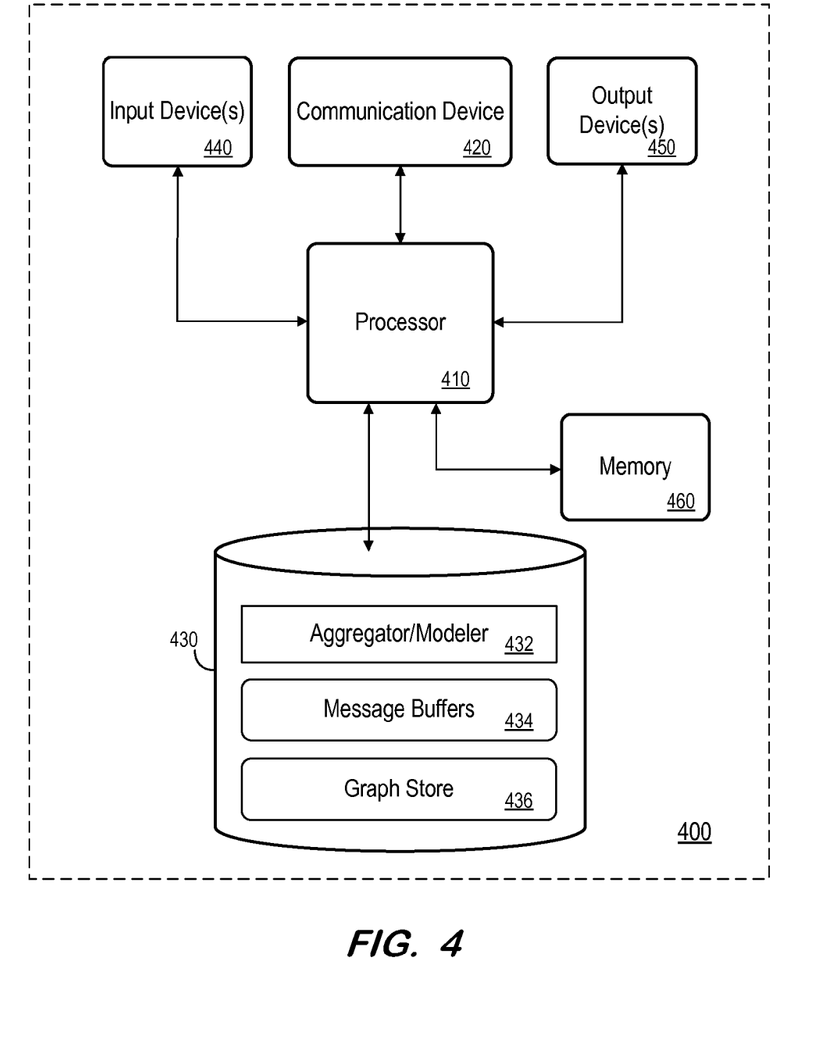
FIG. 4 is a block diagram of an apparatus according to some embodiments.

FIG. 4 is a block diagram of apparatus 400 according to some embodiments. Apparatus 400 may comprise a general-purpose computing apparatus and may execute program code to perform any of the functions described herein. Apparatus 400 may comprise an implementation of elements of aggregator/modeler 110 and/or 310. Apparatus 400 may include other unshown elements according to some embodiments.

Apparatus 400 includes processor 410 operatively coupled to communication device 420, data storage device 430, one or more input devices 440, one or more output devices 450 and memory 460. Communication device 420 may facilitate communication with external devices, such as data sources including Web servers of the World Wide Web. Input device(s) 440 may comprise, for example, a keyboard, a keypad, a mouse or other pointing device, a microphone, knob or a switch, an infra-red (IR) port, a docking station, and/or a touch screen. Input device(s) 440 may be used, for example, to enter information into apparatus 400. Output device(s) 450 may comprise, for example, a display (e.g., a display screen) a speaker, and/or a printer.

Data storage device 430 may comprise any appropriate non-transitory storage device, including combinations of magnetic storage devices (e.g., magnetic tape, hard disk drives and flash memory), optical storage devices, Read Only Memory (ROM) devices, etc., while memory 460 may comprise Random Access Memory (RAM).

Aggregator/modeler 432 of data storage device 430 may comprise program code executable by processor 410 to provide functions described herein, including but not limited to process 200. Embodiments are not limited to execution of these functions by a single apparatus. Message buffers 434 include memory areas associated with particular identifiers, and may also or alternatively be implemented in memory 460. Graph store 436 may associate semantic representations associated with particular identifiers as described above.

Data storage device 430 may also store data and other program code for providing additional functionality and/or which are necessary for operation thereof, such as device drivers, operating system files, etc.

Embodiments described herein are solely for the purpose of illustration. Those in the art will recognize other embodiments may be practiced with modifications and alterations to that described above.

What is claimed is:

1. A method implemented by a computing system in response to execution of program code by a processor of the computing system, the method comprising:
   receiving first text, the first text comprising a first identifier and first additional text;
   storing the first additional text in a memory area associated with the first identifier;
   receiving second text, the second text comprising the first identifier and second additional text;
   storing the second additional text in the memory area associated with the first identifier;
   determining that a characteristic of text stored in the memory area has reached a threshold, the text stored in the memory area comprising at least the first additional text and the second additional text;
   in response to the determination, generating a semantic representation of the text stored in the memory area; and
   storing the semantic representation in association with the first identifier.

2. A method according to claim 1, further comprising:
   receiving third text, the third text comprising a second identifier, third additional text and a hyperlink;
   following the hyperlink to retrieve fourth text associated with the hyperlink;
   generating a second semantic representation of the third additional text and the fourth text; and
   storing the second semantic representation in association with the second identifier.

3. A method according to claim 1, further comprising:
   receiving third text, the third text comprising the first identifier, third additional text and a hyperlink;
   following the hyperlink to retrieve fourth text associated with the hyperlink;
   generating a second semantic representation of the third additional text and the fourth text;
   combining the second semantic representation with the stored semantic representation; and
   storing the combined semantic representation in association with the first identifier.

4. A method according to claim 1, further comprising:
   receiving third text before receiving the second text, the third text comprising a second identifier and third additional text;
   storing the third additional text in a second memory area associated with the second identifier before storing the second additional text in the memory area associated with the first identifier;
   receiving fourth text after storing the second additional text in the memory area associated with the first identifier, the fourth text comprising the second identifier and fourth additional text;
   storing the fourth additional text in the second memory area associated with the second identifier;
   determining that a characteristic of text stored in the second memory area has reached a second threshold, the text stored in the second memory area comprising at least the third additional text and the fourth additional text;
   in response to the determination, generating a second semantic representation of the text stored in the second memory area; and
   storing the second semantic representation in association with the second identifier.

5. A method according to claim 1, further comprising:
   receiving third text comprising the first identifier and third additional text after storing the semantic representation;
   storing the third additional text in a second memory area associated with the first identifier;
   receiving fourth text comprising the first identifier and fourth additional text after storing the third text in the second memory area;
   storing the fourth additional text in the second memory area associated with the first identifier;
   determining that a characteristic of text stored in the second memory area has reached a second threshold, the text stored in the second memory area comprising at least the third additional text and the fourth additional text;
   in response to the determination, generating a second semantic representation of the text stored in the second memory area;
   combining the second semantic representation with the stored semantic representation; and
   storing the combined semantic representation in association with the first identifier.

6. A method according to claim 1, wherein storing the first additional text in the memory area associated with the first identifier comprises:
   determining that no memory area is associated with the first identifier; and
   allocating the memory area in association with the first identifier.

7. A non-transitory medium storing computer-executable program code, the program code executable by a computer to:
   receive first text, the first text comprising a first identifier and first additional text;
   store the first additional text in a memory area associated with the first identifier;
   receive second text, the second text comprising the first identifier and second additional text;
   store the second additional text in the memory area associated with the first identifier;
   determine that a characteristic of text stored in the memory area has reached a threshold, the text stored in the memory area comprising at least the first additional text and the second additional text;
   in response to the determination, generate a semantic representation of the text stored in the memory area; and
   store the semantic representation in association with the first identifier.

8. A non-transitory medium according to claim 7, the program code further executable by a computer to:
   receive third text, the third text comprising a second identifier, third additional text and a hyperlink;
   follow the hyperlink to retrieve fourth text associated with the hyperlink;
   generate a second semantic representation of the third additional text and the fourth text; and
   store the second semantic representation in association with the second identifier.

9. A non-transitory medium according to claim 7, the program code further executable by a computer to:
   receive third text, the third text comprising the first identifier, third additional text and a hyperlink;
   follow the hyperlink to retrieve fourth text associated with the hyperlink;
   generate a second semantic representation of the third additional text and the fourth text;
   combine the second semantic representation with the stored semantic representation; and
   store the combined semantic representation in association with the first identifier.

10. A non-transitory medium according to claim 7, the program code further executable by a computer to:
   receive third text before the second text is received, the third text comprising a second identifier and third additional text;
   store the third additional text in a second memory area associated with the second identifier before the second additional text is stored in the memory area associated with the first identifier;
   receive fourth text after storing the second text in the memory area associated with the first identifier, the fourth text comprising the second identifier and fourth additional text;
   store the fourth additional text in the second memory area associated with the second identifier;
   determine that a characteristic of text stored in the second memory area has reached a second threshold, the text stored in the second memory area comprising at least the third additional text and the fourth additional text;
   in response to the determination, generate a second semantic representation of the text stored in the second memory area; and
   store the second semantic representation in association with the second identifier.

11. A non-transitory medium according to claim 7, the program code further executable by a computer to:
   receive third text comprising the first identifier and third additional text after storing the semantic representation;
   store the third additional text in a second memory area associated with the first identifier;
   receive fourth text comprising the first identifier and fourth additional text after storing the third additional text in the second memory area;
   store the fourth additional text in the second memory area associated with the first identifier;
   determine that a characteristic of text stored in the second memory area has reached a second threshold, the text stored in the second memory area comprising at least the third additional text and the fourth additional text;
   in response to the determination, generate a second semantic representation of the text stored in the second memory area;
   combine the second semantic representation with the stored semantic representation; and
   store the combined semantic representation in association with the first identifier.

12. A non-transitory medium according to claim 7, wherein the program code further executable by a computer to store the first additional text in the memory area associated with the first identifier comprises program code further executable by a computer to:
   determine that no memory area is associated with the first identifier; and
   allocate the memory area in association with the first identifier.

13. A system comprising:
   a first memory device;
   a second memory device; and
   a processor to execute processor-executable program code in order to cause the system to:
   receive first text, the first text comprising a first identifier and first additional text;
   store the first additional text in an area of the first memory device associated with the first identifier;
   receive second text, the second text comprising the first identifier and second additional text;
   store the second additional text in the area of the first memory device associated with the first identifier;
   determine that a characteristic of text stored in the area of the first memory device has reached a threshold, the text stored in the area of the first memory device comprising at least the first additional text and the second additional text;
   in response to the determination, generate a semantic representation of the text stored in the area of the first memory device; and
   store the semantic representation in association with the first identifier in the second memory device.

14. A system according to claim 13, the processor to execute processor-executable program code in order to further cause the system to:
   receive third text, the third text comprising a second identifier, third additional text and a hyperlink;
   follow the hyperlink to retrieve fourth text associated with the hyperlink;
   generate a second semantic representation of the third additional text and the fourth text; and
   store the second semantic representation in association with the second identifier in the second memory device.

15. A system according to claim 13, the processor to execute processor-executable program code in order to further cause the system to:
   receive third text, the third text comprising the first identifier, third additional text-and a hyperlink;
   follow the hyperlink to retrieve fourth text associated with the hyperlink;
   generate a second semantic representation of the third additional text and the fourth text;
   combine the second semantic representation with the stored semantic representation; and
   store the combined semantic representation in association with the first identifier in the second memory device.

16. A system according to claim 13, the processor to execute processor-executable program code in order to further cause the system to:
   receive third text before the second text is received, the third text comprising a second identifier and third additional text;
   store the third additional text in a second memory area of the first memory device associated with the second identifier before the second additional text is stored in the memory area of the first memory device associated with the first identifier;
   receive fourth text after storing the second text in the memory area of the first memory device associated with the first identifier, the fourth text comprising the second identifier and fourth additional text;
   store the fourth additional text in the second memory area of the first memory device associated with the second identifier;
   determine that a characteristic of text stored in the second memory area of the first memory device has reached a second threshold, the text stored in the second memory area comprising at least the third additional text and the fourth additional text;

in response to the determination, generate a second semantic representation of the text stored in the second memory area; and store the second semantic representation in association with the second identifier in the second memory device.

17. A system according to claim 13, the processor to execute processor-executable program code in order to further cause the system to:

receive third text comprising the first identifier and third additional text after storing the semantic representation;

store the third additional text in a second memory area of the first memory device associated with the first identifier;

receive fourth text comprising the first identifier and fourth additional text after storing the third additional text in the second memory area of the first memory device;

store the fourth additional text in the second memory area of the first memory device associated with the first identifier;

determine that a characteristic of text stored in the second memory of the first memory device area has reached a threshold, the text stored in the second memory area of the first memory device comprising at least the third additional text and the fourth additional text;

in response to the determination, generate a second semantic representation of the text stored in the second memory area of the first memory device;

combine the second semantic representation with the stored semantic representation; and store the combined semantic representation in association with the first identifier in the second memory device.

18. A system according to claim 13, wherein storage of the first additional text in the memory area of the first memory device associated with the first identifier comprises:

determination that no memory area is associated with the first identifier; and allocation of the memory area in association with the first identifier.

* * * * *